(12) United States Patent
Sakiyama et al.

(10) Patent No.: US 10,429,532 B2
(45) Date of Patent: Oct. 1, 2019

(54) SYSTEM AND METHODOLOGY FOR ESTIMATING FORMATION ELASTIC PROPERTIES USING DECOMPOSED AND UNDECOMPOSED SIGNAL

(71) Applicant: Schlumberger Technology Corporation, Sugar Land, TX (US)

(72) Inventors: Naoki Sakiyama, Tokyo (JP); Denis Syresin, Kanagawa-ken (JP)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 215 days.

(21) Appl. No.: 15/474,371

(22) Filed: Mar. 30, 2017

(65) Prior Publication Data

US 2017/0285206 A1 Oct. 5, 2017

Related U.S. Application Data

(60) Provisional application No. 62/316,511, filed on Mar. 31, 2016.

(51) Int. Cl.
*G01V 1/50* (2006.01)
(52) U.S. Cl.
CPC .......... *G01V 1/50* (2013.01); *G01V 2210/626* (2013.01); *G01V 2210/6242* (2013.01)
(58) Field of Classification Search
CPC ............. G01V 1/50; G01V 2210/6242; G01V 2210/626
See application file for complete search history.

(56) References Cited

U.S. PATENT DOCUMENTS

| | | | | |
|---|---|---|---|---|
| 6,188,961 B1 * | 2/2001 | Mandal | ..................... | G01V 1/50 702/6 |
| 6,631,783 B2 * | 10/2003 | Khan | ..................... | G01V 1/005 181/105 |
| 7,310,285 B2 * | 12/2007 | Donald | ................... | G01V 1/284 367/40 |
| 7,646,674 B2 * | 1/2010 | Yogeswaren | ............. | G01V 1/44 181/102 |
| 7,830,747 B2 * | 11/2010 | Sollner | ................... | G01V 1/305 367/51 |
| 8,155,377 B2 * | 4/2012 | Dvorkin | ................... | E21B 47/00 175/249 |

(Continued)

FOREIGN PATENT DOCUMENTS

WO 2016141110 A1 9/2016

OTHER PUBLICATIONS

Alford, R. M., Shear Data in the Presence of Azimuthal Anisotropy: Dilley, Texas. SEG Technical Program Expanded Abstracts, Paper S9.6, 1986, pp. 476-479. Houston, Texas.

(Continued)

*Primary Examiner* — Krystine E Breier

(57) ABSTRACT

A technique facilitates estimating elastic properties of formations by exciting a wavefield and acquiring the signal with and without azimuthal decompositions. For example, the elastic properties may be estimated by exciting a multipole wavefield and acquiring the signal with and without the azimuthal decomposition. The technique is effective for estimating elastic properties of azimuthally homogeneous and heterogeneous formations including isotropic and anisotropic formations.

20 Claims, 5 Drawing Sheets

(56) References Cited

U.S. PATENT DOCUMENTS

| | | | | |
|---|---|---|---|---|
| 8,625,390 B2* | 1/2014 | Wang | ............... | G01V 1/46 367/34 |
| 8,755,248 B2* | 6/2014 | Wang | ............... | G01V 1/46 367/31 |
| 9,631,483 B2* | 4/2017 | Donderici | ............ | G01V 1/48 |
| 2016/0109606 A1* | 4/2016 | Market | ............ | G01V 1/50 367/25 |
| 2017/0284193 A1* | 10/2017 | Zhang | ............ | E21B 47/124 |

OTHER PUBLICATIONS

Wang et al., Theory of Unipole Acoustic Logging Tools and Their Relevance to Dipole and Quadrupole Tools for Slow Formations. SPE Annual Technical Conference and Exhibition. Oct. 30-Nov. 2, 2011 SPE 145515. Denver. Colorado, USA 15 pages.

Nwosu et al., Enhancing Shale Reservoir Completion Design Using Oriented Unipole Logging While Drilling Sonic Measurements in Horizontal Well. SPWLA 56th Annual Logging Symposium, Jul. 18-22, 2015. Long Beach, California. 9 pages.

Kimball, Christopher. Shear Slowness measurement by dispersive processing of the borehole flexural mode. Geophysics, vol. 63, No. 2. Mar.-Apr. 1998 pp. 337-344.

Kimball et al., Sembalance processing of borehole accoustic array data. Geophysics, vol. 49, No. 3, Mar. 1974. pp. 274-281.

* cited by examiner

Firing Mode for Monopole, Dipole, Quadrupole, and Unipole

Example of Low-Frequency Dipole (n=1) for the Process (A)-(B)

Example of High-Frequency Dipole (n=1) for the Process (A)-(D)

SYSTEM AND METHODOLOGY FOR ESTIMATING FORMATION ELASTIC PROPERTIES USING DECOMPOSED AND UNDECOMPOSED SIGNAL

CROSS-REFERENCE TO RELATED APPLICATION

The present document is based on and claims priority to U.S. Provisional Application Ser. No. 62/316,511, filed Mar. 31, 2016, which is incorporated herein by reference in its entirety.

BACKGROUND

Hydrocarbon fluids, e.g. oil and natural gas, are obtained from a subterranean geologic formation, referred to as a reservoir, by drilling a well that penetrates the hydrocarbon-bearing formation. Various logging tools are used to obtain information regarding the surrounding hydrocarbon-bearing formation. In some applications, a wireline and logging-while-drilling (LWD) tool is used in a drill string to obtain logging data. In azimuthally heterogeneous formations, conventional multipole logging has certain limitations because, for example, the signal processing averages formation properties over different azimuths.

SUMMARY

In general, the present disclosure provides a system and methodology for estimating elastic properties of formations by exciting a wavefield and acquiring the signal with and without azimuthal decompositions. For example, the elastic properties may be estimated by exciting a multipole wavefield and acquiring the signal with and without the azimuthal decomposition. The technique is effective for estimating elastic properties of azimuthally homogeneous and heterogeneous formations including isotropic and anisotropic formations.

BRIEF DESCRIPTION OF THE DRAWINGS

Certain embodiments will hereafter be described with reference to the accompanying drawings, wherein like reference numerals denote like elements. It should be understood, however, that the accompanying figures illustrate various implementations described herein and are not meant to limit the scope of various technologies described herein, and.

DETAILED DESCRIPTION

Figure 1:
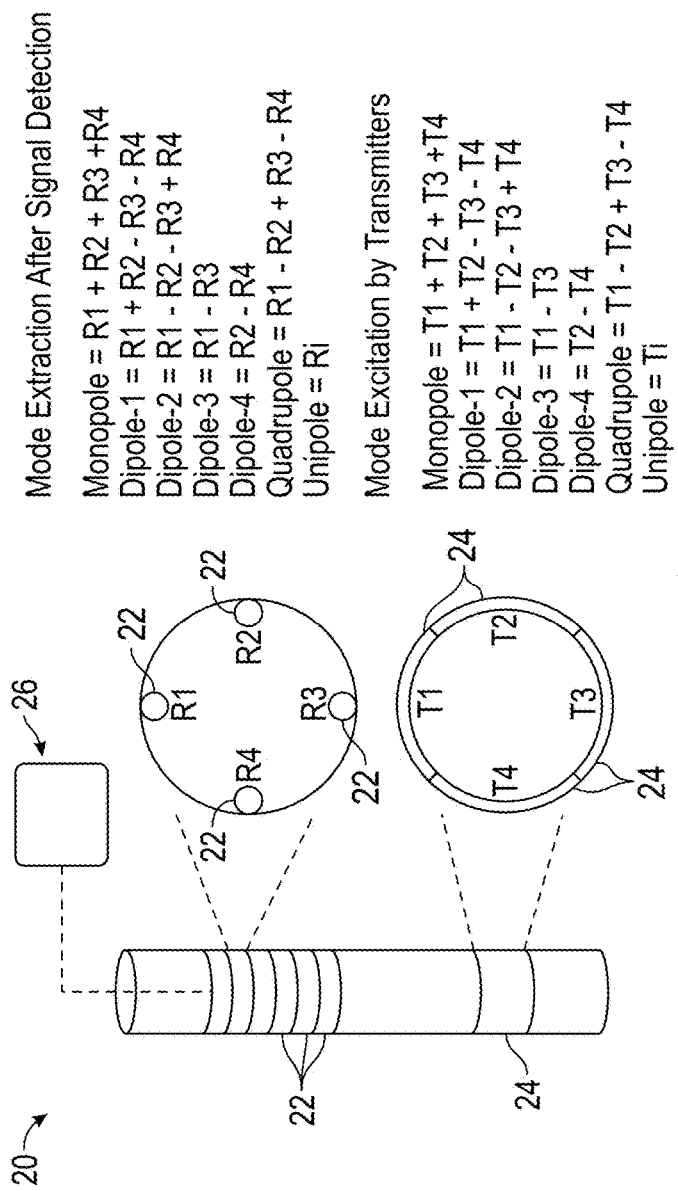
FIG. 1 is a schematic illustration of an example of a well system including a sonic tool string with excitation transmitters and receivers, according to an embodiment of the disclosure.

In the following description, numerous details are set forth to provide an understanding of some illustrative embodiments of the present disclosure. However, it will be understood by those of ordinary skill in the art that the system and/or methodology may be practiced without these details and that numerous variations or modifications from the described embodiments may be possible.

The disclosure herein generally relates to a system and methodology for estimating elastic properties of formations. Estimates may be obtained by exciting a wavefield and acquiring the signal with and without azimuthal decompositions. The signal data is obtained by, for example, an array of receivers and provided to a data processing system operated to determine the estimates. According to an example, the elastic properties may be estimated by exciting a multipole wavefield and acquiring the signal with and without the azimuthal decomposition. The technique is effective for estimating elastic properties of azimuthally homogeneous and heterogeneous formations including isotropic and anisotropic formations. The processed data may then be used to, for example, map elastic properties in the formation and to output the mapped data to a suitable display.

The techniques disclosed herein may be used to facilitate and improve data acquisition and analysis in various downhole tools and systems. Various types of downhole tools and systems may utilize arrays of sensing devices positioned downhole to obtain the desired signal data. The arrays of sensing devices may be configured for easy attachment and detachment in downhole sensor tools or modules deployed for purposes of sensing data which relates to environmental and/or tool parameters within a borehole. The tools and sensing systems disclosed herein may effectively sense and store characteristics relating to components of downhole tools as well as formation parameters, e.g. formation parameters at elevated temperatures and pressures.

According to an embodiment, sensing systems may be incorporated into tool systems such as wireline logging tools, measurement-while-drilling tools, logging-while-drilling tools, permanent monitoring systems, drill bits, drill collars, sondes, or other downhole tool systems. The downhole tool systems may be conveyed downhole via suitable conveyances, such as wireline, cable line, slick line, coiled tubing, or other suitable mechanisms for delivering the tools and sensing systems downhole. At desired positions in the borehole, acoustic signals may be transmitted and then received via the sensing system. The received acoustic signals are then processed as described herein to provide estimates (and sometimes maps or other output formats) of formation elastic properties.

For example, embodiments described herein provide a technique for estimating elastic properties of formations by exciting a wavefield, e.g. a monopole wavefield, dipole wavefield, or other multipole wavefield, and acquiring the returning signal with and without azimuthal decomposition. The technique is effective for estimating elastic properties of azimuthally homogeneous or heterogeneous formations including isotropic and anisotropic formations. Various systems of multi-mode excitation transmitters and receivers may be used in sonic logging tools or other types of tools to obtain the desired information on a given formation.

Referring generally to FIG. 1, an embodiment of a tool 20, e.g. a sonic logging tool, is illustrated. In this example, the tool 20 comprises a sonic logging tool having an array of receivers 22, e.g. receivers R1, R2, R3, R4, and a plurality of transmitters 24, e.g. transmitters T1, T2, T3, T4. The plurality of transmitters 24 and the array of receivers 22 transmit and receive, respectively, acoustic signals with different azimuthal harmonics. For example, monopole, dipole, quadrupole, and unipole wavefields can be excited and acquired by the sonic logging tool 20. Examples of the mode excitation by transmitters 24 are illustrated in FIG. 1 as Monopole, Dipole-1, Dipole-2, Dipole-3, Dipole-4, Quadrupole, Unipole. Similarly, examples of the mode extraction after signal detection via receivers 22 are illustrated with respect to the corresponding modes: Monopole, Dipole-1, Dipole-2, Dipole-3, Dipole-4, Quadrupole, Unipole. The data extracted by receivers 22 may be sent to a processing system 26, e.g. a computer-based processing system, to process the acoustic signal data. In this embodiment, the array of receivers 22 comprises azimuthally distributed receivers 22.

Figure 2:
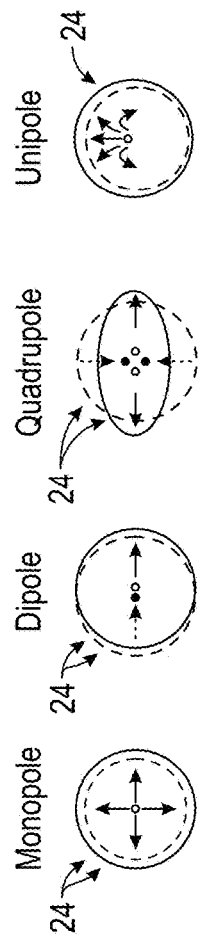
FIG. 2 is a schematic illustration of examples of firing modes for monopole, dipole, quadrupole, and unipole modes, according to an embodiment of the disclosure.

With additional reference to FIG. 2, characteristics of multipole excitation (including unipole) have been illustrated. It should be noted the dipole excitation example in FIG. 2 corresponds with Dipole-4 illustrated in FIG. 1. Due to the directivity of the firing directions, dipole and unipole may be used for estimating azimuthal variation of elastic properties. The estimation is especially effective for anisotropic formations and may be used in, for example, a deviated well in vertical axis of symmetry (VTI) formations.

Figure 3:
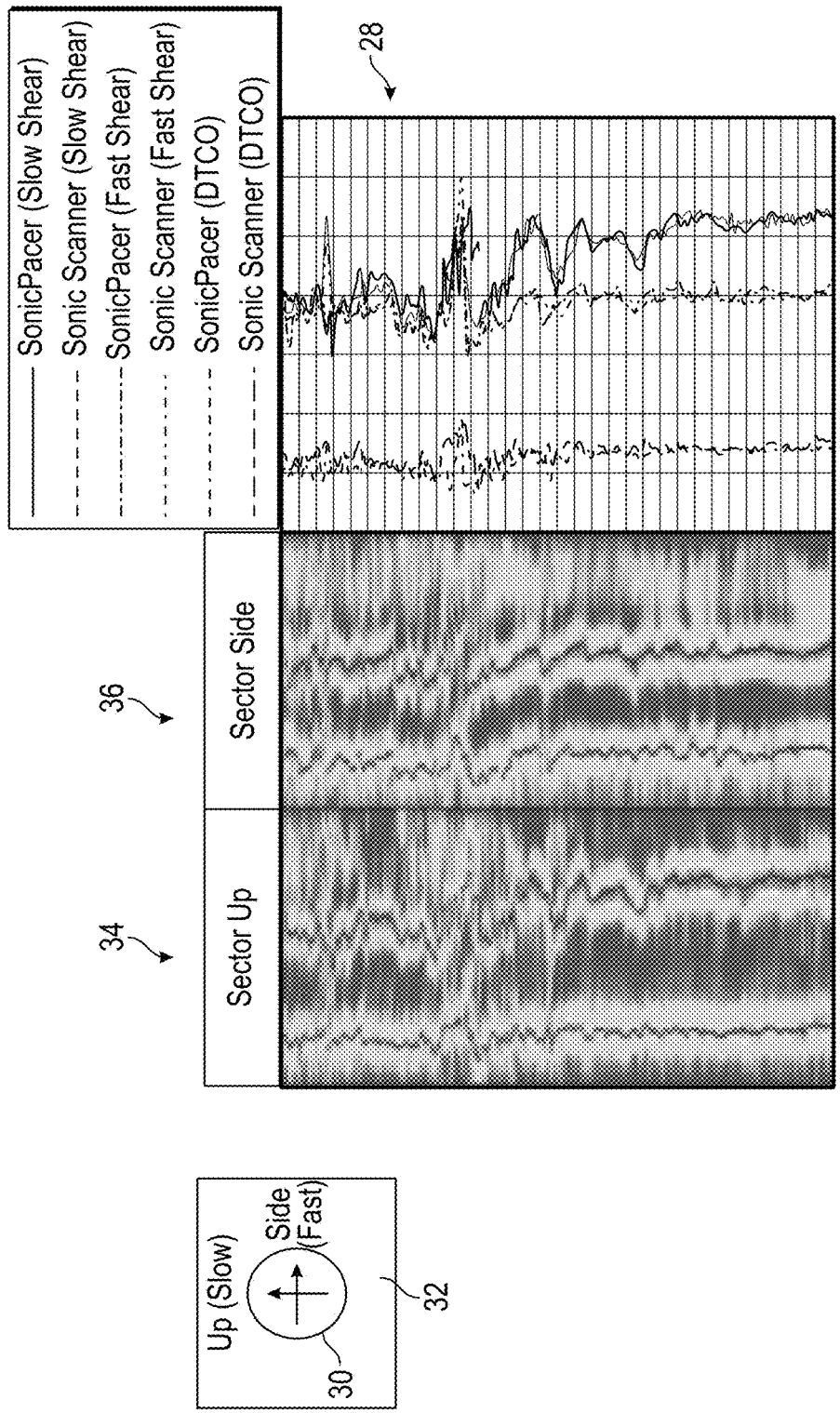
FIG. 3 is a graphical illustration of an example of a slowness comparison between unipole and dipole modes, according to an embodiment of the disclosure.

Referring generally to FIG. 3, a graphical example has been provided that represents signal data from receivers 22 which has been processed by processing system 26. The processed signal data is illustrated as output to a display 28, e.g. a display screen of processing system 26. In this example, the data is represented in compressional (P) and shear (S) slowness logs obtained with respect to a horizontal well 30 in a VTI formation 32 for both a sector up direction 34 and a sector side direction 36. In this example, both the dipole log and the unipole log show consistent results with respect to each other. By way of example, the processing system 26 may utilize suitable software or other programs for calculating and outputting the dipole and unipole logs. According to one example, the dipole log may be determined via the Sonic Scanner Acoustic Scanning Platform available from Schlumberger Corporation, and the unipole log may be determined via the SonicPacer Acoustics Shale Evaluation system also available from Schlumberger Corporation.

Figure 4:
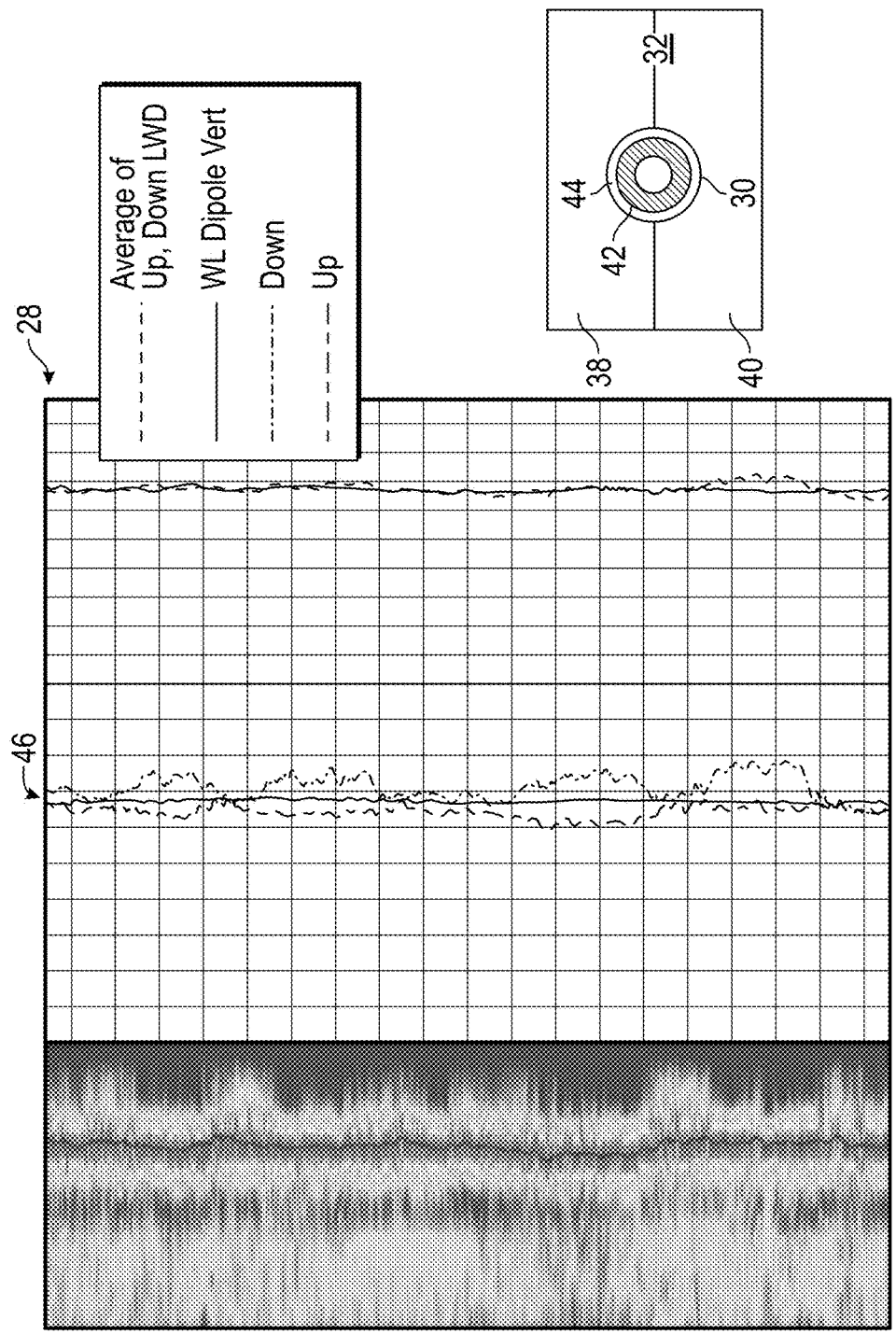
FIG. 4 is a graphical illustration of an example of a unipole mode used in an azimuthally heterogeneous formation and cited in Nnadozie Nwosu, Jeff Alford, Hanatu Kadir, Jason Byl, 2015, Enhancing Shale Reservoir Completion Design Using Oriented Unipole Logging While Drilling Sonic Measurements in Horizontal Well, SPWLA 56th Annual Logging Symposium, July 18-22.

The situation is different if formations are azimuthally heterogeneous as shown on the left side of the graphical display illustrated in FIG. 4. In this example, the horizontal well 30 has intersecting bed boundaries with an up sector 38, e.g. up side, and a down sector 40, e.g. down side. A drill string collar 42 is illustrated as disposed in the borehole of well 30 and is surrounded by mud 44. As illustrated on the right side of FIG. 4, a second track 46 of the log compares shear slowness acquired by unipole mode with respect to the corresponding up side 38 (labeled UP) and down side 40 (labeled DOWN) and acquired by dipole mode (labeled WL dipole). While the unipole mode provides different slownesses corresponding to the two different formations (up side 38 and down side 40), the dipole mode shows an averaged slowness of the two layers. The example illustrated in FIG. 4 indicates certain limitations of dipole logging for azimuthally heterogeneous formations. One such limitation is caused by the azimuthal decomposition process of dipole measurements.

Conventional multipole logging has been conducted by a decomposition process using azimuthally distributed receiver arrays. However, embodiments described herein involve exciting a multipole mode via an evaluating acoustic signal with and without azimuthal decomposition of waveforms. This unique approach improves the ability to characterize elastic properties, e.g. compressional (P) and shear (S) slownesses, of formations as compared to conventional approaches.

It should be noted unipole mode measurements alone have certain limitations such as complexity of dispersion analysis and less coherent slow shear arrivals when signal data is collected in a deviated well formed in strong VTI anisotropic formations. Furthermore, dipole mode measurements alone in sonic applications have certain limitations such as inaccurate measurements in azimuthally heterogeneous formations. Combining such measurements can be useful but also can result in redundant acquisition time and data storage especially for logging-while-drilling applications. However, the multipole mode approach described herein overcomes such limitations for estimating elastic properties with respect to azimuthally heterogeneous formations and certain other types of formations.

Figure 5:
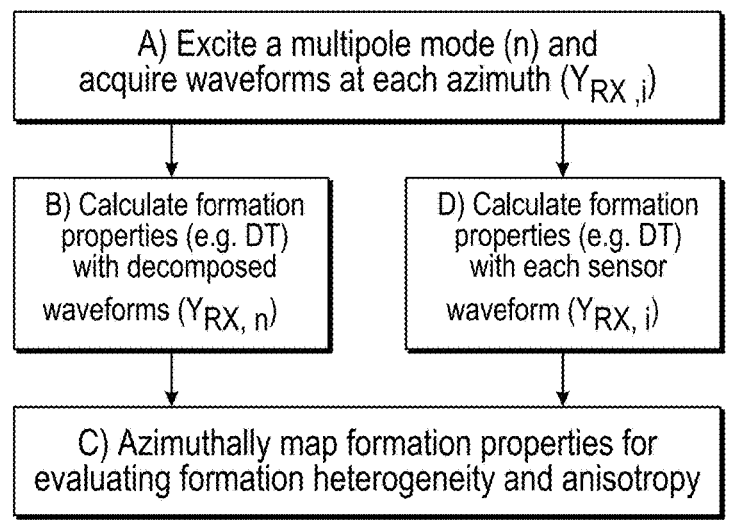
FIG. 5 is a flowchart illustrating an example of a workflow for evaluating formation anisotropy and heterogeneity, according to an embodiment of the disclosure.

According to an embodiment, acquiring the $n^{th}$ order multipole mode involves exciting the $n^{th}$ order multipole mode via transmitters 24 and acquiring sensor waveforms via receivers 22 followed by the $n^{th}$ order azimuthal decomposition (see block A of the workflow chart illustrated in FIG. 5). The waveforms may be acquired at each azimuth ($Y_{RX,i}$). Then, the decomposed waveforms (represented by $Y_{RX,n}$) are also obtained. Application of a modal decomposition to the waveforms acquired by the multipole firing and azimuthally distributed receivers 22 for extracting the n-th azimuthal harmonics can be achieved according to the following equation:

$$Y_{RX_n}(t) = \frac{\sum_{i=1}^{J} Y_{RX_i}(t) \cdot \cos(n\theta_i)}{\sum_{i=1}^{J} \cos^2(n\theta_i)}$$

Here, $\theta_i$ stands for the azimuthal position of the receiver 22 which takes $Y_{RXi}$ waveforms. This allows formation elastic properties, e.g. compressional and shear slownesses, to be calculated and obtained by processing $Y_{RX,n}$ via processing system 26, as represented by block B in FIG. 5. The compressional and shear slownesses, for example, can be calculated from the semblance processing according to the so called STC (Slowness-Time-Coherence) method (see, for example, Christopher V. Kimball and Thomas L. Marzetta, Semblance processing of borehole acoustic array data, Geophysics, Vol. 49, No. 3, March 1984). By way of further example, the compressional and shear slownesses can be calculated from a DSTC (Dispersive Slowness-Time-Coherence) method (see, for example, Christopher V. Kimball Shear slowness measurement by dispersive processing of the borehole flexural mode, Geophysics, Vol. 63, No. 2, March-April 1998). The STC and DSTC methods may be used both for the decomposed and undecomposed waveforms. If the desired orientation for the signal analysis is not in line with the alignment of receivers 22, then a process of rotating waveforms and/or composing waveforms via algebraic transform over multiple azimuthal waveforms may be conducted. An example of this general workflow is indicated in blocks A and B of FIG. 5.

According to another workflow path, the formation elastic properties may be obtained from the $i^{th}$ azimuthal array of receivers 22. In this case, the formation elastic properties are obtained without azimuthal decomposition of waveforms, as represented by block D in FIG. 5. The sensor waveforms without azimuthal decomposition are represented by $Y_{RX,i}$.

In this embodiment, the slownesses calculated for $Y_{RX,n}$ and $Y_{RX,i}$ can be compared for evaluating formation heterogeneity and anisotropy as shown in block C of FIG. 5. For example, formation properties may be azimuthally mapped to evaluate the formation heterogeneity and anisotropy. This is useful especially with logging-while-drilling in view of geosteering and geolanding applications where knowledge regarding the relative position of the well being drilled with respect to the formation layer may be important. By way of example, the mapping may comprise outputting the mapping data to a display, e.g. a display of processing system 26, to provide a map with respect to azimuth around a wellbore. With reference to the workflow example illustrated in FIG. 5, it should be noted the processes represented in blocks B and D may be accompanied with signal processing at different frequency bands and time windows to facilitate the estimation of elastic properties in the formation.

Figure 6:
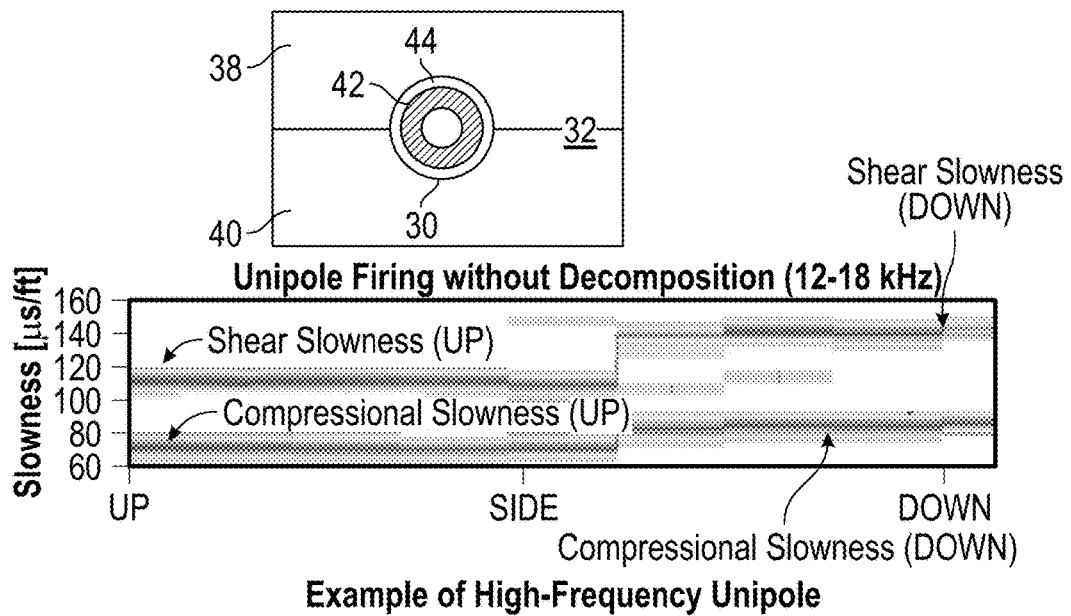
FIG. 6 is a graphical illustration of an example of unipole mode firing without decomposition and an example of a high-frequency unipole mode provided for reference, according to an embodiment of the disclosure.

Referring generally to FIG. 6, a graphic illustration is provided of a reference acquired by high-frequency unipole modeling. In this example, the data represented is based on unipole mode firing without decomposition at 12-18 kHz. The graphical illustration shows that the slowness log as a function of azimuth corresponds with the azimuthal heterogeneity of formations.

Figure 7:
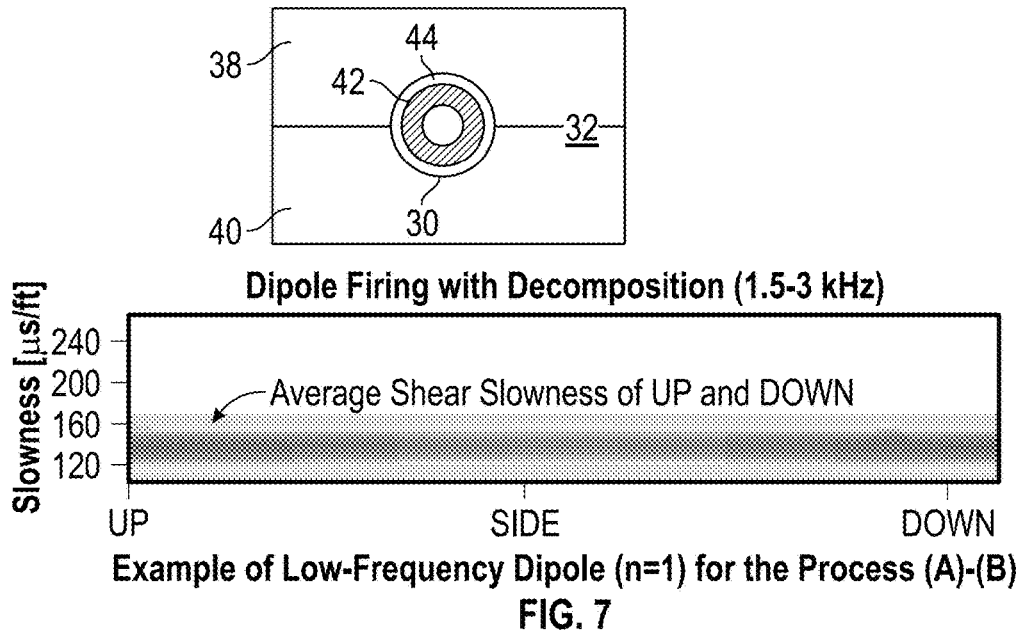
FIG. 7 is a graphical illustration of an example of a low-frequency dipole mode (n=1) for the workflow (A)-(B) provided in the flowchart illustrated in FIG. 5, according to an embodiment of the disclosure.
Figure 8:
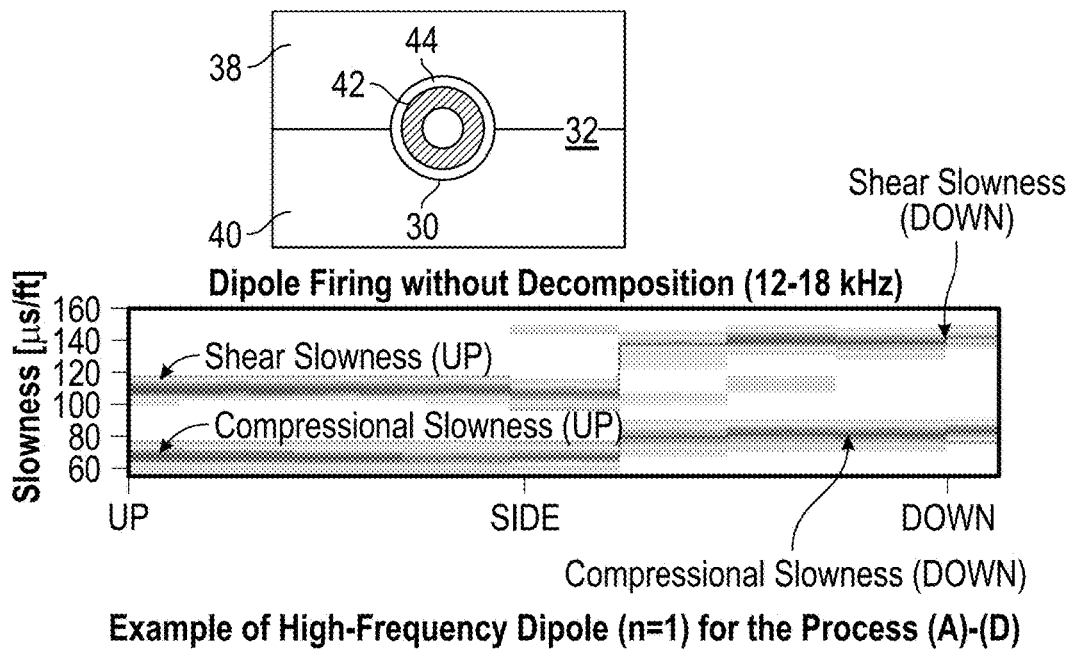
FIG. 8 is a graphical illustration of an example of a high-frequency dipole mode (n=1) for the workflow (A)-(D) provided in the flowchart illustrated in FIG. 5, according to an embodiment of the disclosure.

Referring generally to FIGS. 7 and 8, further examples are provided utilizing dipole mode firing with decomposition at 1.5-3 kHz (see FIG. 7) and dipole mode firing without decomposition at 12-18 kHz (see FIG. 8). These examples are for a logging-while-drilling dipole mode (n=1) utilizing both the (A-B) and (A-D) workflow processes illustrated in the workflow chart of FIG. 5. In this example, the workflow processes are for azimuthally heterogeneous formations and the data processing may be performed on processing system 26 and/or other suitable data processing systems.

As illustrated, with decomposed low-frequency dipole waveforms, heterogeneous characteristics of formations are not seen. Without decomposing waveforms, however, the azimuthally different slowness log(s) can be obtained using high-frequency waveforms. The slownesses of the waveforms at the up sector 38 correspond to compressional and shear slowness of the up formation. At the down sector 40, slownesses corresponding to the down formation is observed as well as slownesses corresponding to the up formation.

Accordingly, the azimuthal heterogeneity of formations can be addressed and elastic properties estimated if the multipole wavefield is processed as described herein and as indicated graphically in FIGS. 7 and 8. As described herein, the multipole wavefield is processed with both the decomposed signal and also the undecomposed signal. According to an embodiment, processing of the decomposed signal and also the undecomposed signal can be accomplished by processing acoustic signal data at a sufficiently high frequency band.

If VTI anisotropy exists in homogeneous formations, the low-frequency dipole mode shows fast and slow shear slownesses. As a result, the decomposed and undecomposed waveforms can be compared to estimate elastic properties. For example, such a comparison may be effective for estimating elastic properties of heterogeneous formations and/or anisotropic formations. Regardless of the specific type of formation, borehole, or equipment deployed downhole, the technique of using decomposed and undecomposed waveforms enables changes to be made in exploiting a given reservoir found in the formation. For example, the improved estimation of elastic properties provides information which can be used to adjust drilling parameters, e.g. drilling directions. Additionally, the improved estimation facilitates optimization of well treatment, well completion, well production, and/or other aspects of utilizing the well and formation.

The systems and processes described herein may be used to estimate elastic properties of formations in a variety of environments. By way of example, embodiments described herein may be used with various types of equipment deployed downhole into deviated wellbores, e.g. horizontal wellbores. The equipment may comprise logging equipment or other types of equipment combined with appropriate transmitters 24 and receivers 22. Additionally, the receivers 22 and transmitters 24 may be arranged in various patterns and positions. With certain embodiments described herein, for example, the receivers 22 may be arranged in an array or arrays to receive acoustic signal data in the form of a plurality of azimuthally distributed axial array waveforms. Elastic properties of the formation may then be calculated, as described above, using each of the axial array receiver waveforms of the plurality of azimuthally distributed axially array waveforms. Similarly, processing system 26 may comprise various types of computer-based processing systems for processing data, outputting graphical log displays, and indicating appropriate courses of action based on the estimated elastic properties of the formation.

Although a few embodiments of the system and methodology have been described in detail above, those of ordinary skill in the art will readily appreciate that many modifications are possible without materially departing from the teachings of this disclosure. Accordingly, such modifications are intended to be included within the scope of this disclosure as defined in the claims.

What is claimed is:
1. A method for evaluating a formation, comprising:
exciting a multipole wavefield;
acquiring an acoustic signal;
determining waveforms of the acoustic signal without azimuthal decomposition to obtain undecomposed waveforms;
applying modal decomposition to the waveforms for extracting n-th azimuthal harmonics to obtain decomposed waveforms; and
comparing the undecomposed waveforms and the decomposed waveforms to estimate elastic properties of the formation.

2. The method as recited in claim 1, wherein comparing comprises using the acoustic signal to estimate elastic properties of isotropic formations.

3. The method as recited in claim 1, wherein comparing comprises using the acoustic signal to estimate elastic properties of anisotropic formations.

4. The method as recited in claim 1, wherein comparing comprises using the acoustic signal to estimate elastic properties of azimuthally homogeneous formations.

5. The method as recited in claim 1, wherein comparing comprises using the acoustic signal to estimate elastic properties of azimuthally heterogeneous formations.

6. The method as recited in claim 1, wherein comparing comprises calculating formation properties using each of the axial array receiver waveforms of a plurality of azimuthally distributed axial array waveforms.

7. The method as recited in claim 1, further comprising performing acoustic signal processing at different frequency bands and time windows.

8. The method as recited in claim 1, further comprising mapping formation properties with respect to azimuth around a wellbore to evaluate formation heterogeneity and anisotropy.

9. The method as recited in claim 1, wherein comparing comprises estimating elastic properties in the form of compressional (P) and shear (S) slownesses.

10. The method as recited in claim 1, wherein exciting comprises employing monopole excitations and dipole excitations, including unipole excitations.

11. The method as recited in claim 1, wherein acquiring comprises acquiring the signal with a sonic logging tool.

12. The method as recited in claim 1, wherein acquiring comprises acquiring the signal with a sonic logging tool having an array of transmitters and an array of receivers including azimuthally distributed receivers.

13. A method, comprising:
providing a sonic logging tool with a plurality of transmitters and a plurality of receivers;
conveying the sonic logging tool downhole into a borehole;
operating the plurality of transmitters to excite a multipole wavefield;
acquiring an acoustic signal via the plurality of receivers, the acoustic signal being acquired with and without azimuthal decomposition to obtain decomposed waveforms and undecomposed waveforms, respectively, the decomposed waveforms being obtained by applying modal decomposition in a manner to extract n-th azimuthal harmonics;
using the acoustic signal acquired to estimate elastic properties of the formation by comparing the undecomposed waveforms and the decomposed waveforms; and
mapping the formation based on the estimate of elastic properties.

14. The method as recited in claim 13, wherein using comprises using the acoustic signal to estimate elastic properties of isotropic formations.

15. The method as recited in claim 13, wherein using comprises using the acoustic signal to estimate elastic properties of anisotropic formations.

16. The method as recited in claim 13, wherein using comprises using the acoustic signal to estimate elastic properties of azimuthally homogeneous formations.

17. The method as recited in claim 1, wherein using comprises using the acoustic signal to estimate elastic properties of azimuthally heterogeneous formations.

18. A system for evaluating a formation, comprising:
a tool having: a plurality of acoustic transmitters to excite a multipole wavefield; a plurality of azimuthally distributed acoustic receivers to acquire acoustic signals with and without azimuthal decomposition; and a processing system configured to process the acoustic signals with and without azimuthal decomposition to estimate elastic properties of the formation, the processing of the acoustic signals with azimuthal decomposition comprising applying modal decomposition of waveforms of the acoustic signals acquired by the azimuthally distributed acoustic receivers to extract the n-th azimuthal harmonics.

19. The system as recited in claim 18, wherein the tool is a sonic logging tool.

20. The system as recited in claim 19, wherein the processing system outputs a map of the formation based on the estimate of elastic properties.

* * * * *